United States Patent [19]

Speakman

[11] Patent Number: 4,844,627
[45] Date of Patent: Jul. 4, 1989

[54] INTERFERENCE FIT BEARINGS

[75] Inventor: Eugene R. Speakman, Fullerton, Calif.

[73] Assignee: McDonnell Douglas Corporation, Long Beach, Calif.

[21] Appl. No.: 881,501

[22] Filed: Jun. 12, 1986

Related U.S. Application Data

[63] Continuation of Ser. No. 516,861, Jul. 25, 1983, abandoned.

[51] Int. Cl.$^4$ ............................................. F16C 23/04
[52] U.S. Cl. .................................................... 384/208
[58] Field of Search ............... 384/208, 206, 207, 209, 384/203, 204

[56] References Cited

U.S. PATENT DOCUMENTS 2,272,118  2/1942  Imse et al. ........................ 384/206
3,535,006  10/1970  Orkin et al. ....................... 384/206

*Primary Examiner*—Lenard A. Footland
*Attorney, Agent, or Firm*—George W. Finch; John P. Scholl; Gregory A. Cone

[57] ABSTRACT

This interference fit bearing is divided into an outer and an inner bearing assembly. The outer bearing assembly has an outside radial dimension measured from the center of the bearing which is at least 0.002 inches larger than the opening into which it will be interference fit. The inside radial dimension of the outer bearing assembly will be larger than the outer radial dimension of the inner bearing assembly prior to insertion of the bearing into the receiving hole in the interference fit. When the outer and inner bearing assemblies of the interference fit bearing are pressed into the hole in the receiving load bearing element, the compression of the bearing by the receiving hole will act to force the outer bearing assembly into the proper tolerance fit with the inner bearing assembly of the bearing. At the same time the receiving hole is prestressed by the interference fit which will dramatically decrease fretting and stress corrosion which would otherwise occur under cyclic loads in the load bearing element at its interface with the bearing.

10 Claims, 5 Drawing Sheets

INTERFERENCE FIT BEARINGS

This is a continuation, of application Ser. No. 516,861, filed July 25, 1983, now abandoned.

BACKGROUND OF THE INVENTION

1. Field of the Invention

This invention relates to bearings. More particularly, this invention relates to bearings which are interference fit into receiving structural elements which support relatively high reversing loads.

2. Description of the Prior Art

The simplest way to transfer a load from one structural element to another is to rigidly fasten the two together with some sort of fastening means such as a rivet or a bolt or to weld or glue the two elements together. However, it is often necessary that provision be made for some amount of movement between the two structural elements which largely precludes these simple joining measures. To meet this need, various different types of bearings have been developed, depending upon the particular application needed and the transference of the load from one element to another. Since this invention was initially developed in the context of that class of bearings known as spherical bearings, the prior art will be discussed in this rather limited area. However, it should be realized and, indeed, immediately apparent that the application of this invention is not limited solely to spherical bearings but to essentially any bearing assembly susceptible to the interference fit concepts presented herein.

There are several types of spherical bearings in use today. Two types are the captive ball and the two piece ball and outer race type of spherical bearings. In applications in the aircraft industry, these bearings are commonly used to transfer a reversing load from a shaft such as a bolt to an attachment point, commonly a relatively thick planar section of high strength aluminum through which the shaft passes. With both types of spherical bearings, there is an inner ball means through which the shaft passes and an outer race means which slides into the aluminum structural support means. The relative motion between the shaft and the aluminum support element is taken up by the spherical bearing sliding surface found between the inner ball means and the outer race means. Turning to the captive ball type of spherical bearing, this type is formed by a process in which a straight wall liner bushing is centered on the ball and then swaged down to the shape of the ball. During this formation process, it is impossible to achieve 100% sliding contact with the ball since elastic spring back of the liner bushing and an inherent arching effect produced thereby combine to leave considerably less than a 50% contact area in the spherical contacting surfaces of the bearing. This assembly is then lightly roll released or impact hammered to stretch the outer race to provide a closer sliding fit with only about 50% contact area. Nevertheless, the arched gap remains. An unfortunate side effect of the formation of the outer race is that the bearing sliding surface of the outer race is relatively rough due to the swaging and limited roll releasing. This type of bearing is always installed with a net to very low press fit to prevent binding and freezing the movement of the spherical bearing. This low press fit and the inherent voids between the ball and the outer race, commonly at least 50%, cause fretting, low fatigue life and significant axial movement of the bearing measured along the axis of the shaft within the structural housing. Roll staking of the bearing does not restrict this movement under high reversing loads, and high impact loads on the bearing increase the radial clearances, which in turn aggravate fretting and stress corrosion to acccelerate bearing failure. The second type of spherical bearing in use today is the two piece ball and outer race spherical bearing. In this type of spherical bearing, the ball is in two pieces which are slip fit through and rotated into the outer race. These spherical ball bearings are precision ground and lapped to provide a 100% sliding contact fit between the ball and the outer race. This largely avoids the arching problems inherent in the above discussed bearing; however, these bearings are 50% more expensive, and the two piece ball presents some application problems. These bearings must also be installed with a net to low press fit to prevent freezing up movement of the bearing. With a 100% spherical bearing ball contact area, this type of bearing is much easier to freeze up than is the swaged captive ball type of spherical bearing. As with the captive ball type spherical bearing, the two piece ball and outer race spherical bearing, due to its low press fit, allows significant axial and inline movement, which in turn leads to stress corrosion and fretting and resulting failure of the bearing.

Two more types of spherical bearings in current use are the Messerschmidt or "window slot" spherical bearing and a variation on the swaged captive ball bearing discussed above. The Messerschmidt bearing has a significant portion of the outer race cut out to allow for the insertion of the inner ball. This cutout seriously weakens the bearing. The swaged captive ball variation starts with an outer race which is machined to fit one half of the inner ball with the other half being a straight wall bushing into which the inner ball is inserted. Once the ball is inserted, the straight wall half is swaged down onto the inner ball to capture it. As with the previous two types of spherical bearings, these last two types are installed with net sliding fits or low press fits, and, as above, the inherent tolerances necessary for these fits allow for the cyclic motion under load which causes relatively rapid failure in all the prior art spherical bearings.

None of the prior art spherical bearings lend themselves to high press interference fit applications. Such applications would automatically produce binding and freezing of the spherical bearings.

SUMMARY OF THE INVENTION

The intereference fit bearing of this invention comprises an outer bearing assembly means received by an interference fit within a first load bearing element in combination with an inner bearing assembly means attached to a second load bearing element. Prior to installation in a receiving hole in the first load bearing element, the outer bearing assembly means has an outside radial dimension measured from the center of the bearing means to the perimeter of the outer bearing assembly means which is at least 0.002 inches larger than the receiving opening in the first load bearing element. The corresponding interior radial dimension of the outer bearing assembly means exceeds the radial dimension of the inner bearing assembly means prior to the interference fit installation. Once the inner and outer bearing assemblies are installed together in the interference fit into the receiving hole in the first load bearing element, the interference fit desirably produces a prestress condition in the region surrounding the receiving hole in the first load bearing element and further squeezes down the gap between the outer and inner bearing assemblies such that the desired tolerance fit is achieved.

DETAILED DESCRIPTION OF THE INVENTION

The basic concept of the interference fit bearing of this invention finds application in at least three different areas: spherical bearings, ball bearings and roller bearings. For each of these three embodiments, the actual bearing assemblies may be divided into two functional elements, the outer bearing assembly and the inner bearing assembly. It is the outer bearing assembly which will be interference fit into the receiving hole in the receiving structural element. Prior to the high interference fit installation of the outer bearing assembly into its receiving hole, the inner dimensions of the outer bearing assembly will exceed the corresponding outer dimensions of the inner bearing assembly. Once the outer bearing assembly has been inserted with the high interference fit into the receiving hole, its inside dimensions will then be reduced to those required for the proper fit to the inner bearing assembly. In the case of a spherical bearing, the sliding surfaces in the overall bearing assembly will be between the inner surface of the outer bearing assembly and the outer surface of the inner bearing assembly. In the case of the ball and roller bearings, the outer bearing assembly will be a liner bushing which is installed into the receiving hole in a high interference fit. The inner bearing assembly for the ball and roller bearings will be the conventional ball or roller bearing assembly itself. For these last two embodiments, there is no sliding movement between the outer bearing assembly and the inner bearing assembly, since the inner bearing assembly, comprising either the ball or roller bearing, will be installed into the outer bearing assembly or liner bushing in either a net or a close tolerance fit. The actual rotation and sliding motion in the overall bearing assembly will be accommodated by the elements within the inner bearing assembly.

Figure 1:
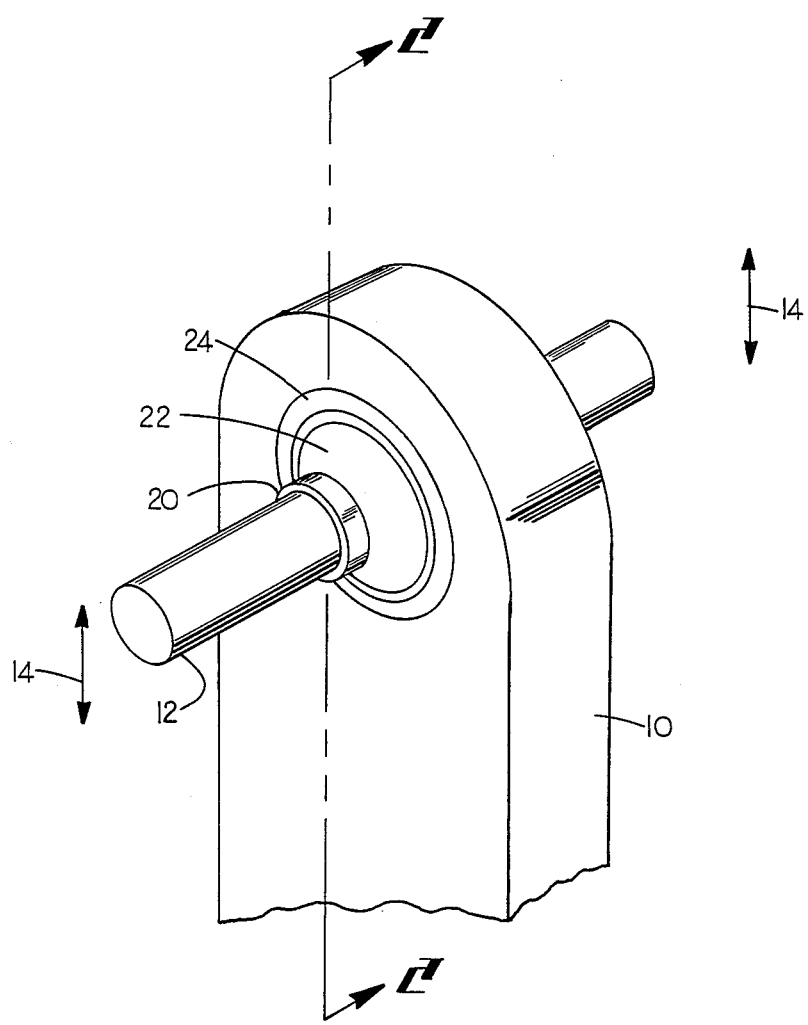
FIG. 1 is an isometric view of a mounted spherical bearing under load.

Turning to FIG. 1, which is an isometric view of a generalized spherical bearing, displayed therein are the first load receiving element 10, the second load bearing element 12, and the various parts of the spherical bearing. These parts are the inner bushing 20 which surrounds the second load bearing element, the ball 22, and the outer race 24. To place the elements of the spherical bearing within the context of the nomenclature of this invention, the inner bearing means here comprises the inner bushing 20 and the ball 22. The outer bearing assembly means comprises the outer race 24 and its staking groove, not shown. The spherical bearing in FIG. 1 is shown as being subject to a reversing load in the directions shown by the arrows 14. In many applications, the inner bushing may be omitted entirely as a separate element. In such cases, the second load bearing element 12 will be received directly by the inside surface of the ball 22.

Figure 2:
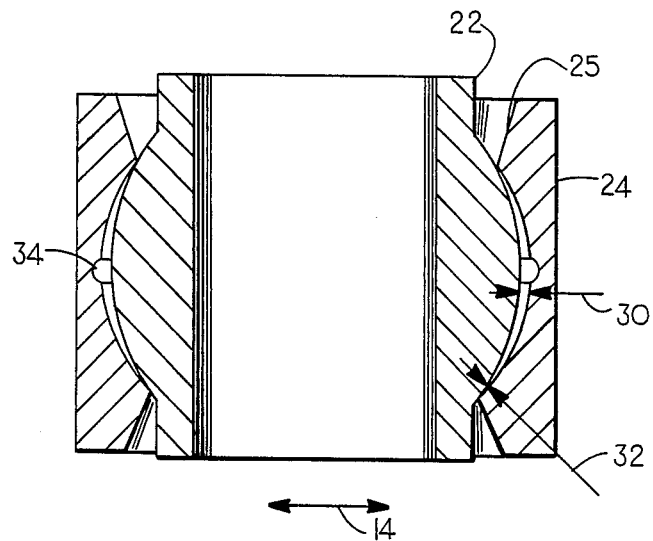
FIG. 2 is a sectional view taken along section line 2—2 in FIG. 1 showing a prior art swaged ball spherical bearing.

FIG. 2 is a cross sectional view taken along section lines 2—2 in FIG. 1 showing a prior art swaged captive type spherical bearing. The corresponding elements from FIG. 1 are the ball 22 and the outer race 24. The inner bushing 20 has been omitted from this and succeeding figures. Additional items identified in this view are the beveled portion 25 of the outer race 24, and the grease groove 34 in the outer race 24. Of primary interest in this view are the arrows 30 and 32 showing the differing clearances between the sliding bearing surfaces of this prior art bearing. The arrows 30 show the arched area of the bearing and arrows 32 show the very limited contact area for the bearing. The arched area is an inherent byproduct of the swage forming which fits the outer race 34 to the ball 22 in this type of prior art spherical bearing. Unfortunately, this large clearance in the area 30 marked by the arrows causes detrimental looseness in the bearing and in its surrounding and receiving hole when the assembly is subjected to a high amplitude reversing load shown here as 14. Also the arching allows the ball 22 to wander within the pattern race 24 along the axial direction of the bearing; that is, the direction parallel to the bearing centerline.

Figure 3:
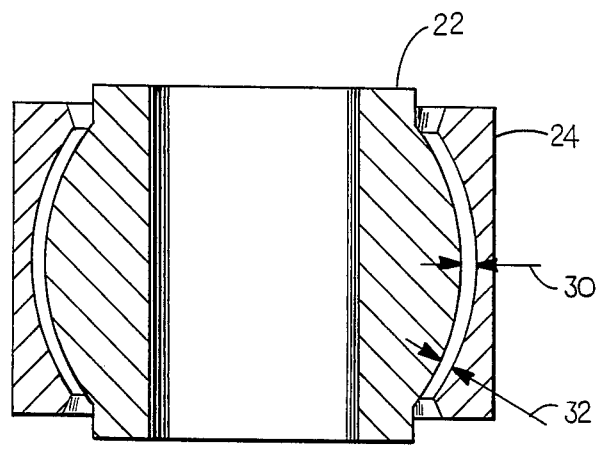
FIG. 3 is a sectional view taken along section line 2—2' in FIG. 1 showing the spherical bearing of this invention.

The prior art spherical bearing of FIG. 2 should be contrasted to the cross sectional view of the interference fit spherical bearing of the present invention shown in FIG. 3. FIG. 3 shows the interference fit spherical bearing assembly in its unassembled configuration. The portions of the interference fit spherical bearing corresponding to those shown in FIG. 1 are the ball 22 and the outer race 24. As before, the components of the interference fit spherical bearing corresponding to the nomenclature of this invention are the inner bushing 20, if employed, and the ball 22 which correspond to the inner bearing assembly and the outer race 24 which corresponds to the outer bearing assembly. Again, this view shows the interference fit spherical bearing assembly in its unassembled configuration. As such, the outer race 24 is separated from the ball 22 by a controlled radial looseness shown by the arrows at 30 and 32. In contrast to FIG. 2 in which there is a marked difference between these two dimensions in the prior art bearing, the present spherical bearing shows that the radial dimensions measured at both points are substantially identical. When the bearing assembly of FIG. 3 is inserted into its receiving hole in the high interference fit condition called for by this invention, the controlled radial looseness will collapse down to a condition of the desired net sliding fit over the substantial majority of the sliding surfaces between the outer race 24 and the ball 22. The controlled radial looseness of the outer race 24 is produced by a carefully controlled formation process which will be discussed hereinafter below in more detail. This forming process substantially eliminates the arching phenomenon shown in FIG. 2. However, the elimination of the arching between the ball and the outer race is only one of the desirable effects produced by the present invention. At least as important as the elimination of the arching is the high interference fit installation of the outer bearing assembly into the receiving hole in the receiving structural element. This high interference fit in effect prestresses the receiving hole, enables the receiving structural element to spread the transmitted load more evenly into the areas of the structural element immediately surrounding the receiving hole, and dramatically reduces the pipe organ flutter effect when the assembly within the receiving structural element is subjected to a reversing load. Also, the additional forming desirably improves the smoothness of the finish on the bearing surface of the outer race which is distorted from the prior swaging-roller processing. The prior art captive ball bearings are stuck with this undesirably rough finish on the outer race. Since the ball is normally fabricated from a very hard steel which has been machined to a very smooth finish, the additional stretch forming contemplated by the present invention greatly diminishes the bearing surface roughness in the outer race.

Figure 4:
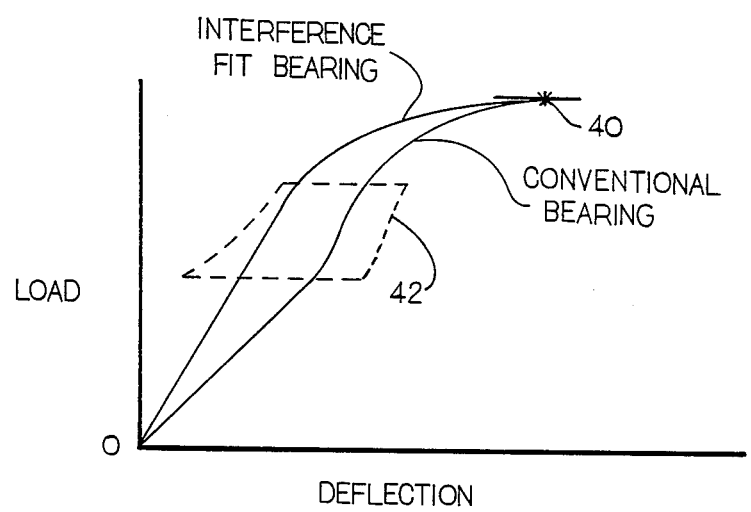
FIG. 4 is a load-deflection graph showing stress curves for different spherical bearings.

The significantly increased fatigue resistance of the interference fit spherical bearing assembly of this invention is shown in comparison to the prior art is partially explained by the graph of FIG. 4. The two axes of the graph are as shown, the load and deflection variables. The two curves are for the interference fit spherical bearing and a conventional prior art captive swaged ball bearing as shown. Although the two curves converge at the maximum bearing load area 40, it is uncommon that these types of bearings will be utilized within this maximum load range. Normally the working loads will be found somewhere further down the curve in region 42 which would represent a region of normal maximum working loading. The difference between the two curves is explained by the fact that the interference fit bearing creates a prestress condition which preloads the receiving hole and avoids the sloppy fit of the net sliding fit prior art bearings. Examination of the two curves clearly indicates that for a given load, the deflection measured from the center of the bearing for the interference fit spherical bearing is significantly less than the deflection for the same load on a conventional spherical bearing. Under cyclic reverse loading conditions, this differential is doubled. In large part, it is this significant decrease in the deflection of the interference fit bearings which allows them to exhibit such significantly higher fatigue life than do the prior art bearings under the same loading conditions.

Figure 5:
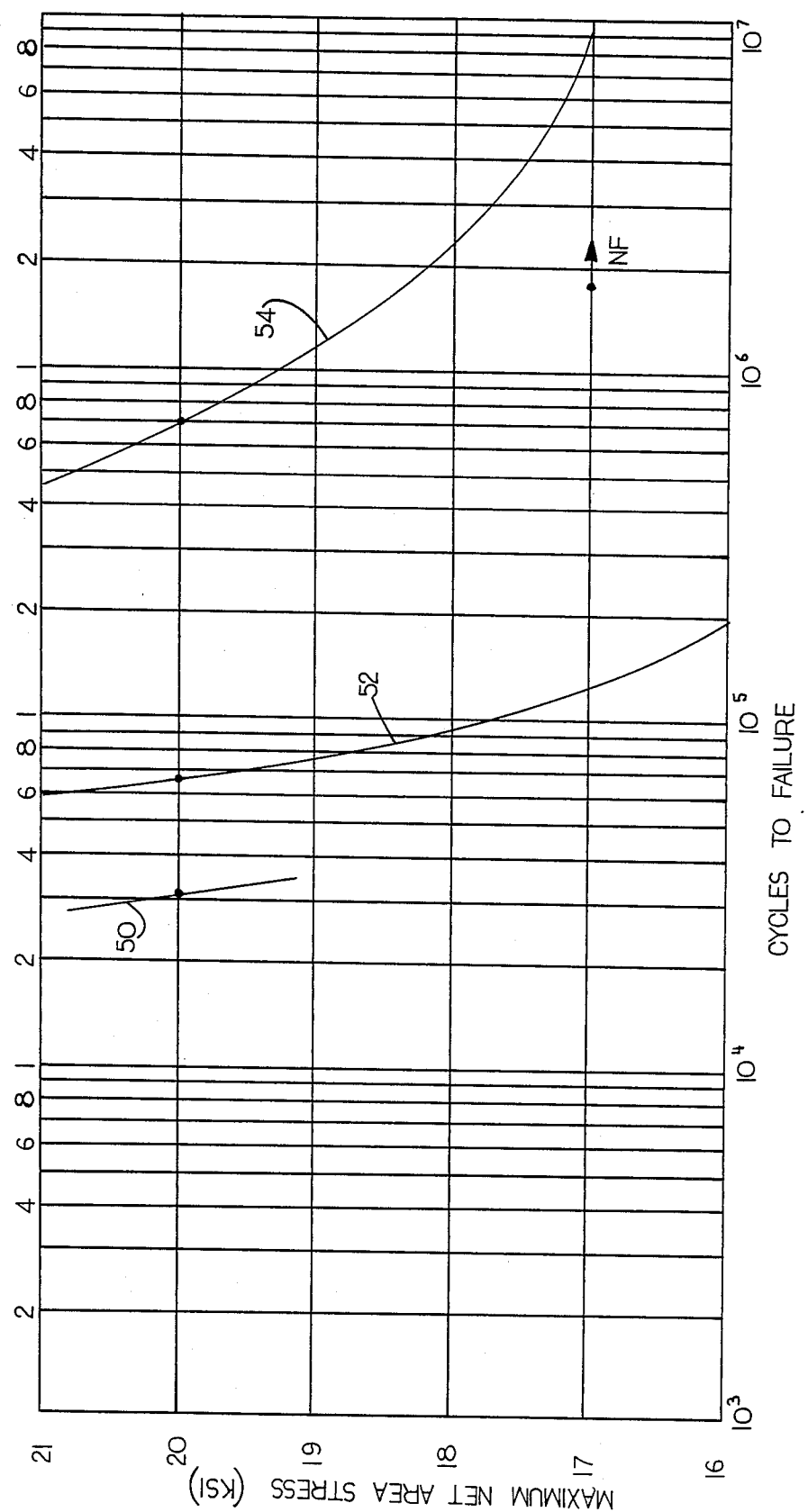
FIG. 5 is a stress-cycles graph showing cycles to failure curves for different types of bearings to different load levels.

FIG. 5 is another graph which plots maximum net area stress (KSI) as a function of the number of cycles to failure. The tests were run on 7075 T6 aluminum plate, three-quarter inch thick configured as in FIG. 1 with the width of the receiving structural element 10 being 3,250 inches, the outside diameter of the spherical bearing assembly being 1.75 inches and the diameter of the inside diameter of the inner bushing 20 which receives the second loading member 12 being 1.00 inches. Curve 50 is for an open hole without any assembly, curve 52 is for a prior art swaged captive ball spherical bearing and curve 54 is for the interference fit spherical bearing of the present invention. The curves are largely self explanitory. All three assemblies were tested to failure at the 20 KSI level with the open hole failing at about 31,000 cycles, the prior art bearing failing at about 64,000 cycles, and the interference fit bearing failing at about 700,000 cycles. At this loading, the interference fit bearing represents a more than ten fold increase in fatigue life over the prior art bearing. At the 17 KSI level, only the prior art bearing was tested to failure at about 120,000 cycles; testing of the interference fit bearing was terminated at 1,700,000 cycles with no failure (NF) when the testing machine failed. Curve 54, however, has been extrapolated to indicate an approximate twenty fold increase in fatigue life at this lower level. Curve 54 was for an interference fit of 0.010 inch.

Figure 6:
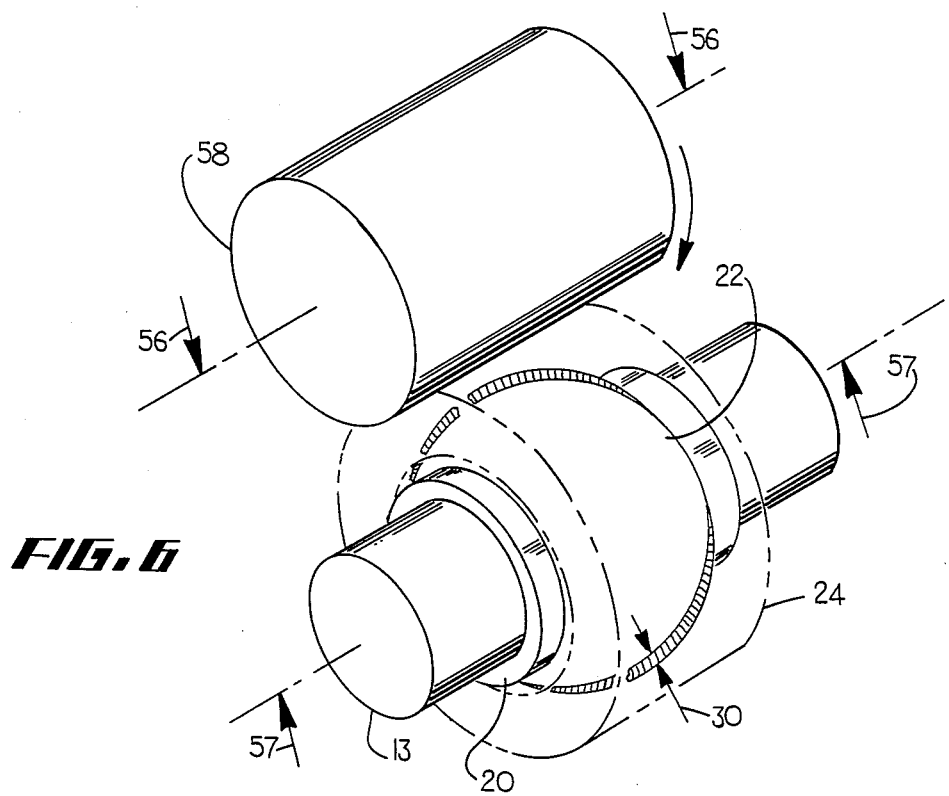
FIG. 6 is an isometric drawing showing one forming process useful in producing the spherical bearing of this invention.

FIG. 6 is an isometric drawing which diagrammatically illustrates the formation process whereby the required radial looseness is imparted between the outer bearing assembly and the inner bearing assembly of the interference fit spherical bearings of this invention. Normally the interference fit spherical bearing will be formed initially in much the same way as would the prior art swaged captive ball type spherical bearing. The inner ball is first machined to the proper shape and then placed on the inner bushing. A straight wall liner bushing is then centered on the ball and then swaged down to the shape of the ball. The swaged down straight ball liner bushing is then machined to take the proper configuration for the outer race of the spherical bearing. At this point, elastic spring back of the liner bushing has produced the arching effect, which leaves less than 50 per cent contact sliding area with the ball. In formation of the prior art spherical bearing, the assembly would then be roll released or impact hammered to stretch the outer race to provide a close sliding fit with only about 50 per cent contact area. Unfortunately, this roll releasing or impact hammering cannot be continued past this point, since to do so would impart unacceptable stretching of the outer race which cannot be tolerated in the prior art spherical bearings since they are not assembled within their receiving holes with an interference fit. Turning again to the interference fit spherical bearing in the present invention, FIG. 6 shows the final formation step in which the spherical bearing with its inner bushing 20, and initial outer race 24 is emplaced upon a bar 13 which engages the inner bushing 20 in a net sliding fit. It should be noted that the arching phenomena shown by the arrows 30 is present at this initial formation step. A rotating roller 58 is then forced down onto the outside perimeter of the outer race 24 with the load vectors 56 and 57 oriented as shown. This roll forming then squeezes down the inner surface of the outer race 24 to substantially exactly conform to the configuration of the ball 22 in the area undergoing the deformation from the roll relieving process. However, this same extended roll relieving acts to stretch the outer race 24 at the same time, much in the same manner as would a piece of pie dough to draw simple analogy. This stretching of the outer race at once produces the desired radial looseness necessary for the interference fit application of the overall bearing assembly and also time renders the overall bearing useless for anything but a high interference fit application. The radial looseness, if applied in a net sliding fit rather than an interference fit, would result in an unacceptably high tolerance looseness within the bearing and resulting very low fatigue life. Although this stretching of the outer race 24 to the required radial looseness for the interference fit application has been shown in the context of roll releasing, it should be realized that other processes could be employed to the same end result of the required radial looseness. The prior art roll releasing formation and steps are somewhat different in that they employ normally at least three outside rollers 56 to surround the outer race 24 in order to attempt to minimize the stretching of the outer race. This type of prior art roll releasing is decidedly inappropriate for use in producing the radial looseness in the interference fit spherical bearings of this invention.

Figure 7:
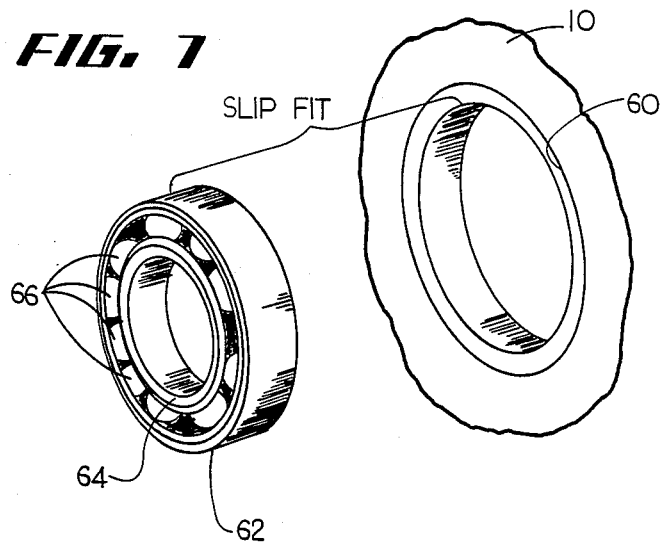
FIG. 7 is an isometric view of the interference fit bearing concept of this invention as applied to interference fit roller bearings.

FIG. 7 is an isometric drawing showing the application of the interference fit concept of this invention to a roller bearing assembly. Here a liner bushing constitutes the outer bearing assembly of the overall interference fit bearing and is emplaced into the receiving hole in the receiving structural element 10 in a high interference fit. As in the prior examples, the outside dimension of the liner bushing prior to installation into the receiving hole is normally at least about 0.002 inches radially larger than the corresponding dimension of the receiving hole. Also the interior radial dimension of the liner bushing exceeds the corresponding outside radial dimension of the stationary outer ring 62 of the inner bearing assembly. Once the liner bushing is installed in the high interference fit within the receiving hole in the receiving structural element 10, the inner bearing means comprising the stationary outer ring 62, the rotating inner ring 64, and the captured ball bearings 66, is inserted in a slip fit into the now compressed liner bushing. It should be realized, of course, that a roller bearing could be substituted for the ball bearings shown in FIG. 7. Normally the liner bushing 60 will swaged or staked as in the preceeding figures; however, this has not been shown in this figure.

Figure 8A:
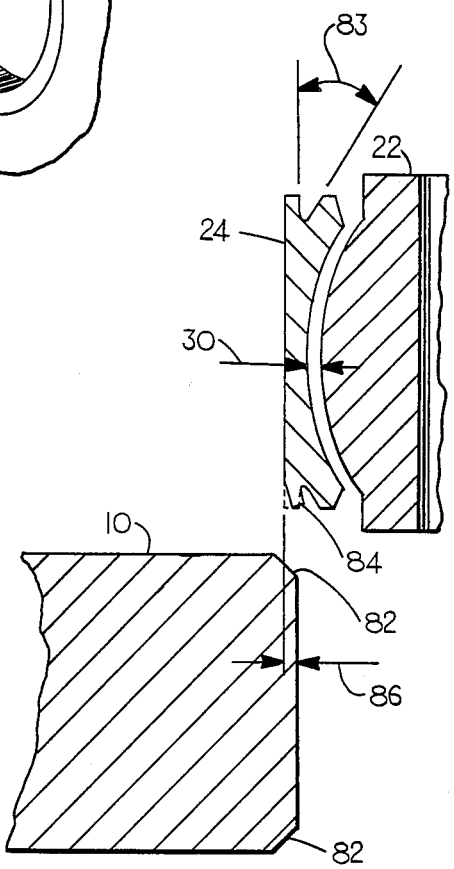
FIGS. 8A and 8B are sectional views showing the installation of the spherical bearing shown in FIG. 3.
Figure 8B:
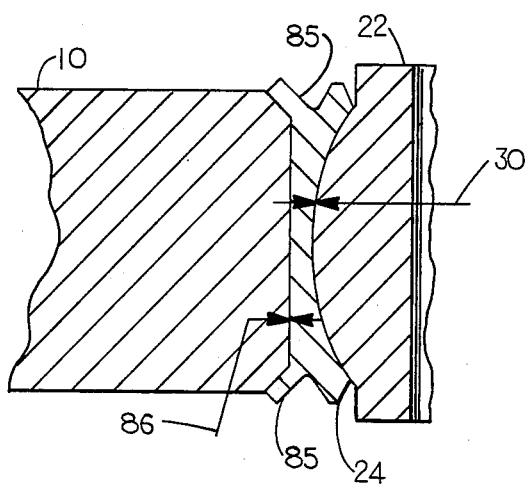

FIGS. 8A and 8B show installation details for the interference fit spherical bearing illustrated in FIG. 3. As in FIG. 3, the inner bearing assembly comprises the ball 22. The inner race has been omitted but may be employed. The outer bearing assembly comprises the outer race 24 which is received within a hole in the supporting structural element 10. In FIG. 8A is shown the bearing assembly prior to installation. Also shown in this figure are the staking grooves found in the outside race 24. These staking grooves are modified Grumman grooves shown as 83. A full Grumman groove is normally a groove having sidewalls which are angled at 60° relative to each other and symmetrically about a vertical axis. The modified Grumman groove used in this invention has a vertical outer groove wall and an inside groove wall inclined at 30° to the vertical side of the groove. Since the outer 24 is interference fit into the receiving hole, it is helpful to bevel the receiving edges of the structural element 10. These receiving edges are beveled as shown by numerals 82. Correspondingly it facilitates installation if the inserted side of the outer race 24 has its outer lip of the Grumman groove bent inward slightly in a mild radius as shown by numeral 84 in an amount less than about 5 degrees. This further eases the insertion of the bearing assembly into the receiving hole. Note in FIG. 8A the controlled radial looseness 30 and the interference dimension 86. Turning to FIG. 8B, this sectional view shows the installed bearing assembly. As in the previous figure, the sectional view shows the ball 22, the outer race 24, and the receiving structural element 10. In this view, the outer lips of the Grummann grooves have now been staked outwardly, as shown by the numerals 85, to securely retain the bearing assembly within the receiving structural element 10. Notice also that as a product of the interference fit, the radial looseness measured at dimension 30 has now collapsed to a net sliding fit and the interference dimension 86 has now collapsed to a high interference fit 86.

Higher interference fits produce increasingly longer fatigue lives. Compared to a net fit bearing which, under a load of 35K51, went 20,000 cycles before failing, a bearing installed with a 0.002 interference went 2.2 times more cycles before failure. Correspondingly, a 0.004" interference fit bearing went 5.0 times longer, a 0.005" interference fit bearing went 6.2 times longer, a 0.006" interference fit bearing went 7.2 times longer, and a 0.007" interference fit bearing went 8.5 times longer on the same load.

I claim:

1. An interference fit bearing comprising outer bearing assembly means received by an interference fit within an opening in a first load bearing element and inner bearing assembly means attached to a second load bearing element such that the outside radial dimension of the outer bearing assembly means is at least 0.002 inches larger than the receiving opening in the first load bearing element prior to the reception of the outer bearing assembly means by the interference fit into the first load bearing element and the corresponding interior radial dimension of the outer bearing assembly means exceeds the outside radial dimension of the inner bearing assembly bearing means by an amount prior to the insertion of the interference fit bearing into the first load bearing element such that the outer and inner bearing assembly means achieve a predetermined tolerance fit over the majority of their contact surfaces after the insertion wherein the respective elements of the inner and outer bearing assemblies adjacent these contact surfaces are one-piece, integral elements and wherein after insertion sufficient tensional stress is created in the first load bearing element adjacent the opening therein to prevent effectively stress corrosion on the surface of the opening caused by cyclic stresses transmitted between the interference fit bearing and the first load bearing element.

2. The interference fit bearing of claim 1 such that the bearing is a spherical bearing in which the inner bearing assembly means comprise inner bushing means surrounding a second load bearing element and ball means having an outer surface which comprises a portion of a sphere and an inner surface concentrically retaining the inner bushing means; and in which the outer bearing assembly means comprises outer race means having an inner surface which substantially encloses the outside surface of the ball means, such that the spherical bearing achieves a net sliding fit between the ball means and the outer race means upon insertion of the bearing into the opening in the first load bearing element.

3. The interference fit bearing of claim 1 such that the bearing is a spherical bearing in which the inner bearing assembly means comprise ball means having an outer surface which comprises a portion of a sphere and an inner surface concentrically surrounding a second load bearing element; and in which the outer bearing assembly means comprises outer race means having an inner surface which substantially encloses the outside surface of the ball means, such that the spherical bearing achieves a net sliding fit between the ball means and the outer race means upon insertion of the bearing into the opening in the first load bearing element.

4. The interference fit bearing of claim 1 in which the outer bearing assembly means additionally comprises a modified Grumman groove means proximate to the outer radial surface of the outer bearing assembly means in which the outer wall of the groove is initially fabricated to be substantially parallel to the outside radial surface of the outer bearing assembly means and the other wall of the groove is inclined at an angle of about 30° to the first groove wall.

5. The interference fit bearing of claim 4 in which the outside lip of the outer bearing assembly means, defined as that portion of the outer bearing assembly means between the outer radial surface and the outer wall of the staking groove, is bent inwardly less than about 5° prior to insertion into the receiving hole in the first load bearing element.

6. The interference fit bearing of claim 5 in which the outside lip of the outer bearing assembly means is crimped outwardly after insertion into the receiving hole to engage the edges of the receiving hole.

7. An interference fit spherical bearing comprising outer race means received by an interference fit within an opening in a first load bearing element and inner bearing assembly means comprising ball means surrounding inner bushing means which captured a second load bearing element such that the outside radial dimension of the unitary outer race means is at least 0.002 inches larger than the receiving opening in the first load bearing element prior to the reception of the outer race means by the interference fit into the first load bearing element such that the outer race means and the ball of the inner bearing assembly means achieve a predetermined close tolerance sliding fit over the majority of their contact surfaces after the insertion and wherein after insertion sufficient tensional stress is created in the first load bearing element adjacent the opening therein to prevent effectively stress corrosion on the surface of the opening caused by cyclic stresses transmitted between the interference fit bearing and the first load bearing element.

8. An interference fit spherical bearing comprising outer race means received by an interference fit within an opening in a first load bearing element and inner bearing assembly means comprising ball means which capture a second load bearing element such that the outside radial dimension of the unitary outer race means is at least 0.002 inches larger than the receiving opening in the first load bearing element prior to the reception of the outer race means by the interference fit into the first load bearing element and the corresponding interior radial dimension of the outer race means exceeds the outside radial dimension of the ball of the inner bearing assembly bearing means by an amount prior to the insertion of the interference fit bearing into the first load bearing element such that the outer race means and the ball of the inner bearing assembly means achieve a predetermined close tolerance sliding fit over the majority of their contact surfaces after the insertion and wherein after insertion sufficient tensional stress is created in the first load bearing element adjacent the opening therein to prevent effectively stress corrosion on the surface of the opening caused by cyclic stresses transmitted between the interference fit bearing and the first load bearing element.

9. An interference fit bearing comprising outer bearing assembly means to be received by an interference fit within an opening in a first load bearing element and inner bearing assembly means to be attached to a second load bearing element such that the outside radial dimension of the outer bearing assembly means is at least 0.002 inches larger than the outside radial dimension of the inner bearing assembly means prior to the reception of the outer bearing assembly means by the interference fit into the first load bearing element such that, after installation by the interference fit, the 0.002 inch difference in radial dimension between the inside radial dimension of the outer bearing assembly and the outside radial dimension of the inner bearing assembly uniformly decreases until an effective sliding tolerance fit is achieved between the outer and inner bearing assembly means over the majority of their contact surfaces therebetween and wherein after insertion sufficient tensional stress is created in the first load bearing element adjacent the opening therein to prevent effectively stress corrosion on the surface of the opening caused by cyclic stresses transmitted between the interference fit bearing and the first load bearing element.

10. The bearing of claim 9 wherein the respective elements of the inner and outer bearing assemblies adjacent the contact surfaces are one-piece, integral elements.

* * * * *